United States Patent [19]

Herschelman

[11] Patent Number: 4,492,384
[45] Date of Patent: Jan. 8, 1985

[54] SEALING ARRANGEMENT

[75] Inventor: Fredric A. Herschelman, Lapeer, Mich.

[73] Assignee: General Motors Corporation, Detroit, Mich.

[21] Appl. No.: 488,066

[22] Filed: Apr. 25, 1983

[51] Int. Cl.³ .......................... F16J 15/02; B60P 3/32
[52] U.S. Cl. ................................ 277/237 R; 296/166
[58] Field of Search ............... 296/166, 23 MC, 24 R; 277/237 R, 212 FB, 213

[56] References Cited

U.S. PATENT DOCUMENTS 2,994,571  8/1961  Peras ................................ 277/213
4,222,605  7/1978  Engelhard .......................... 296/166
4,279,426  7/1981  Flack ............................... 277/237 R

OTHER PUBLICATIONS

Print L-10393 Date Nov. 23, 1971, by General Motors.

Primary Examiner—Robert I. Smith
Attorney, Agent, or Firm—Edward J. Biskup

[57] ABSTRACT

A sealing arrangement between a pair of aligned openings each of which is defined by a frame member and that includes a boot having a pair of opposed arm members adapted to be located in the openings with each arm member being sealingly maintained therein by a molding member which serves to press the associated arm member at localized points into sealing engagement with the associated frame member.

2 Claims, 4 Drawing Figures

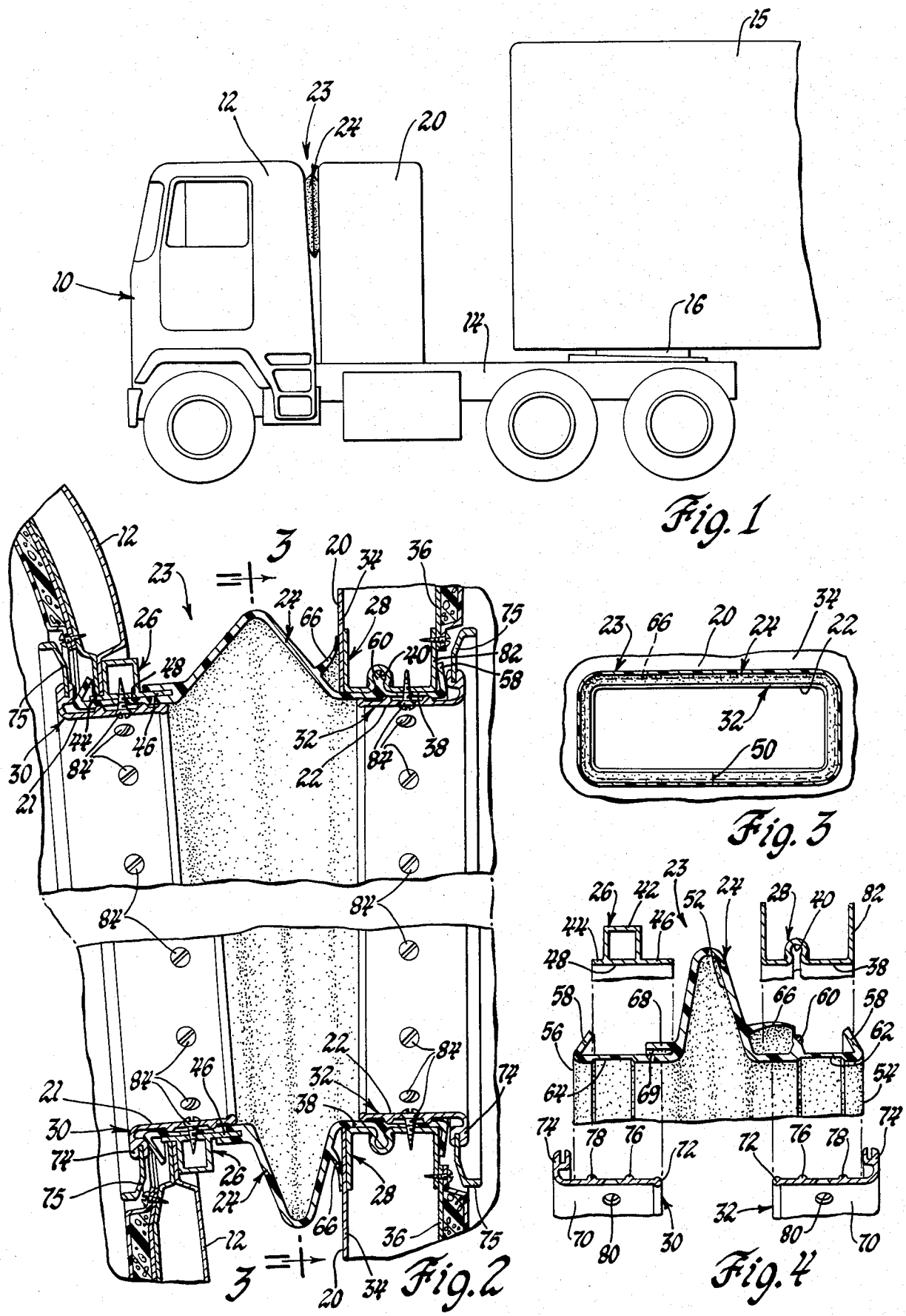

SEALING ARRANGEMENT

This invention relates to a sealing arrangement that includes a boot for sealing a pair of aligned openings formed in a truck cab and a spaced enclosure so as to provide driver access from the cab to the enclosure and also to allow heated or air conditioned air to flow therebetween.

More specifically, the sealing arrangement made in accordance with the present invention serves to seal a first opening formed in the rear portion of a truck cab and a second opening axially aligned with the first opening and formed in the front portion of an enclosure located to the rear and adjacent to the cab. Each of the first and the second openings is defined by a ring type frame member having a continuous mounting surface, and the mounting surface of one of the frame members has a continuous groove formed therein. The sealing arrangement includes a boot which spans the gap between the two openings and provides a sealed passage therebetween which allows the driver to have access to the enclosure without having to leave the vehicle. The boot comprises a continuous elastomeric body portion of uniform cross-section that includes a V-shaped web section integrally formed with a pair of oppositely-extending arm members. Each of the arm members terminates with an outwardly extending reversely bent continuous foot and one of the arm members has a continuous bead member that is integrally formed thereon which extends in the same direction as the associated foot. The bead member is adapted to be snapped into the aforementioned groove in the frame member for maintaining the associated arm member in engagement with the mounting surface of the frame member. A tapered lip is integrally formed on one leg of the web section and terminates adjacent to the bead member when in the unflexed position. In addition, the sealing arrangement includes a pair of molding members each of which has a pair of transversely spaced and continuous ridges formed thereon. The molding members are adapted to be attached to the frame members for maintaining the arm members of the boot in sealing contact with the mounting surfaces of the frame members. Moreover, after the molding members are secured to the associated frame members, the ridges serve to press the associated arm member at localized points thereof into sealing engagement with the frame member and the aforementioned lip sealingly contacts the outer surface of the enclosure around one of the openings.

The objects of the present invention are to provide a new and improved sealing arrangement between a pair of aligned openings that includes a boot terminating at each end with an arm member that is adapted to be located in one of the openings and maintained therein by a molding member having a pair of spaced ridges which serve to press the associated arm at localized points into sealing engagement with a frame member; to provide a new and improved sealing arrangement for a pair of spaced openings that includes a boot having a pair of opposed and outwardly extending arms integral with a V-shaped web and characterized in that one of the arms is formed with a bead member adapted to be snapped into a groove within a window frame located in one of the openings so as to maintain the boot in position during assembly; and to provide a new and improved sealing arrangement for sealing a pair of spaced and axially aligned openings formed in spaced enclosures and that includes an endless elastomeric boot of uniform cross-section having a V-shaped web formed with opposed arms, one of which has an upstanding bead member that is insertable into a groove formed in a frame member which defines one of the openings and serves as a dam for preventing water from entering the interior of one of the enclosures.

The above and other objects of the present invention will be more apparent from the following detailed description when taken with the drawings in which:

FIG. 1 is a side elevational view of a truck supporting a sleeper box located to the rear of the cab and connected thereto by a sealing arrangement that includes a boot for sealing the openings in the front portion of the sleeper box and the rear portion of the cab and providing a passage therebetween, FIG. 2 is an enlarged sectional view of the sealing arrangement showing the aligned openings in the cab and the sleeper box interconnected by the boot in accordance with the present invention.

FIG. 3 is a reduced view taken on line 3—3 of FIG. 2 and shows a portion of the boot and opening provided in the front portion of the sleeper box;

FIG. 4 is an exploded view showing the boot and the pair of moldings used for fastening the boot within the accommodating openings formed in the cab and the sleeper box.

Referring to the drawings and more particularly FIG. 1 thereof, a conventional truck 10 is shown having the usual cab 12 mounted on the truck frame 14, the rear end of which is provided with a fifth wheel 16 which connects the front end of a semi-trailer 15 to the truck 10. Located to the rear of the cab 12 and closely adjacent thereto is a sleeper box 20 which is supported on the frame 14 by rubber mounts (not shown) so as to minimize the transmittal of road-induced vibrations to the sleeper box 20. In order to permit the passage of heated and air-conditioned air between the cab 12 and the sleeper box 20 and also to provide access to the sleeper box for the driver without having to leave the cab 12, the rear window opening 21 of the cab 12 and a window opening 22 of corresponding size and configuration formed in the front portion of the sleeper box, are interconnected by a sealing arrangement 23 made according to the present invention. As seen in FIG. 2 the sealing arrangement includes a boot 24, a pair of window frame members 26 and 28, and a pair of identical molding members 30 and 32 which cooperate to provide a seal around the respective window openings formed in the cab 12 and sleeper box 20 and a passage therebetween.

More specifically and as seen in FIGS. 2 and 3, the opening 22 formed in the front portion of the sleeper box 20 is defined by the window frame member 28 which is rectangular in configuration, U-shaped in cross-section, and secured to the inner and outer sheet metal members 34 and 36, respectively, of the sleeper box 20. As best seen in FIG. 4, the frame member 28 is formed with a flat inner mounting surface 38 which includes a continuous groove or channel 40 formed therein which surrounds the opening 22. Similarly, the opening 21 formed in the rear portion of the cab 12 is defined by the generally rectangular window frame member 26 which, in this case, has a body portion 42 which is square in cross-section and integrally formed with a pair of opposed legs 44 and 46. As with the frame member 28, a flat inner mounting surface 48 is provided on the frame member 26 that surrounds the openings 21.

As seen in FIGS. 2, 3, and 4, the boot 24 is a continuous or endless member made of an elastomer material such as rubber that seals the openings 21 and 22 and provides a passage therebetween. In the preferred form, the boot 24 is an extrusion which is measured for proper length and then formed so as to fit around the frame members 26 and 28 with the ends bonded or vulcanized at a butt joint 50 as seen in FIG. 3. Thus, the boot 24 has a uniform cross-section and, as seen in FIG. 4, includes a V-shaped web section 52 integrally formed with a pair of opposed arm members 54 and 56. Each of the arm members 54 and 56 terminates with an outwardly extending and reversely bent foot 58. A bead member 60, which has a circular head, is integral with the outer surface of the arm member 54 and is located midway between the web section 52 and the associated foot 58. The bead member 60 projects outwardly from the outer surface of the arm member 54 along an axis perpendicular to the plane of the arm member 54 and is adapted to be inserted into the groove 40 formed in the frame member 28 as seen in FIG. 2. The inner surface of the arm member 54 is formed with a channel 62 so that the portion of the arm member 54 between the bead member 60 and the foot 58 is of a reduced thickness. A similar channel 64 is formed in the inner surface of the arm member 56. In addition, a tapered lip 66 is integrally formed with one leg of the web section 52. As seen in FIG. 4, the lip 66 is curved towards and terminates adjacent the bead member 60 when in the unflexed position. Finally, it will be noted that the other leg of the web section 52 is integrally formed with a lip 68 of generally rectangular cross-section that is located in a plane parallel to the plane of the arm member 56 and extends towards the foot 58 associated therewith. The lip 68 is spaced outwardly from the arm member 56 and together with the latter defines a slot 69.

As seen in FIG. 3, each of the molding members 30 and 32 is generally rectangular in configuration and serves to maintain the boot 24 within the respective openings 21 and 22 formed in the cab 12 and the sleeper box 20. It will be understood, however, that rather than having a one-piece molding member, each molding member can be made as an extrusion which is cut and bent to provide two or more sections that will function the same as the one piece rectangular molding members 30 and 32.

As seen in FIGS. 2 and 4, each molding member 30 and 32 comprises a planar body portion 70, one end of which is formed with a bead 72 while the other end is formed with an upwardly extending flange 74 which serves to support an additional trim molding member 75. A pair of spaced continuous ridges 76 and 78 are formed on the inner surface of the planar body portion 70. In addition, a plurality of countersunk holes 80 are provided in the body portion of each molding member 30 and 32 for permitting the molding members to be fastened to the frame members 26 and 28 as will now be explained.

In mounting the boot 24 into the opening 21 and 22 to form the sealing arrangement according to the present invention, the boot 24 may be first heated to make it pliable and afterwards the respective arm members 54 and 56 are seated around the window frames 28 and 26 as seen in FIG. 2. In this regard, it will be noted that during installation into the opening 22 of the sleeper box 20, the foot 58 associated with arm member 54 is wrapped around the inner leg 82 of the frame member 28 and the bead member 60 is snapped into the groove 40 starting from the center top portion of the frame member 28 and working around the sides and bottom until fully seated against the mounting surface 28. The lip 66 is then flexed outwardly so as to sealingly engage the outer sheet metal 34 of the sleeper box 20 around the outside of the opening 22 as seen in FIGS. 2 and 3. Afterwards, the molding member 32 is fastened to the frame member 28 by self-drilling screws 84 which extend through the countersunk holes 80 and through the arm member 54, and then into the frame member 28. It will be understood that the molding member 32 is sized so that the ridges 76 and 78 associated therewith are located in the channel 62 formed in the inner surface of the arm member 54. Thus, when the screws 84 are tightened, the ridges 76 and 78 as well as the bead 72 serve to press the arm member 54 at localized points thereof into sealing engagement with the mounting surface 38 of the frame member 28. When installing the other arm member 56 in the opening 21 of the cab 12, the slot 69 formed by the lip 68 and arm member 56 is received by the leg 46 of the frame member 26 and the foot 58 associated with the arm member 56 is wrapped around the leg 44 of the frame member 26. Afterwards, the molding member 30 is fastened to the frame member 26. The molding member 30 is also configured so that the ridges 76 and 78 thereof are located within the channel 64 of the arm member 56 and together with the bead 72 serve to press the sealing engagement with the frame member 26.

Although only one form of this invention has been shown and described, other forms will be readily apparent to those skilled in the art. Therefore, it is not intended to limit the scope of this invention by the embodiment selected for the purpose of this disclosure but only by the claims which follow.

The embodiments of the invention in which an exclusive property or privilege is claimed are defined as follows:

1. A sealing arrangement for sealing a first opening formed in the rear portion of a cab and a second opening aligned with the first opening and formed in the front portion of an enclosure located adjacent to said cab, said first opening and said second opening each being defined by a ring type frame member having a continuous flat mounting surface, a continuous groove formed in the mounting surface of one of said frame members and having a circular cross sectional configuration, said sealing arrangement including a boot and a pair of molding members, said boot having a continuous elastomeric body portion of uniform cross-section and including a V-shaped web section integrally formed with a pair of oppositely extending arm members, each of said arm members terminating with a radially outwardly extending and reversely bent continuous foot, a continuous bead member having a circular head, said bead member being integrally formed on one of said arm members and extending radially outwardly therefrom in the same direction as the associated foot formed on said one of said arm members, said circular head of said bead member adapted to be snapped into and retained by said groove formed in said one of said frame members for maintaining the associated arm member in engagement with the mounting surface of said one of said frame members, a tapered lip integrally formed on one leg of said web section, said lip being curved towards and terminating adjacent to said bead member when in the unflexed position, each of said molding members having a pair of transversely spaced and continuous ridges formed thereon, and fastener means for securing said pair of molding members to the respective frame members of said first and second openings with an arm member of said boot located between each of said pair of molding members and the associated frame member whereby said pair of ridges serve to press the associated arm member at localized points thereof into sealing engagement with said associated frame member and said lip sealingly contacts the outer surface of said enclosure.

2. A sealing arrangement for sealing a first opening formed in the rear portion of a truck cab and a second opening of a corresponding size and shape aligned with the first opening and formed in the front portion of an enclosure located adjacent to said cab, said first opening and said second opening each being defined by a ring type frame member having a continuous flat mounting surface, a continuous tear-drop shaped groove formed in the mounting surface of one of said frame members, said sealing arrangement including a boot and a pair of molding members, said boot having a continuous elastomeric body portion of uniform cross-section and including a V-shaped web section integrally formed with a pair of oppositely extending arm members, each of said arm members terminating with a radially outwardly extending and reversely bent continuous foot, a continuous bead member having a circular head, said bead member being integrally formed on the outer surface of one of said arm members and extending radially outwardly therefrom in the same direction as the associated foot formed on said one of said arm members, a continuous channel formed on the inner surface of each of said arm members intermediate the web and the associated foot, said circular head of said bead member adapted to be snapped into and retained by said groove formed in said one of said frame members for maintaining the associated arm member in engagement with the mounting surface of said one of said frame members, a tapered lip integrally formed on one leg of said web section, said lip being curved towards and terminating adjacent to said bead member when in the unflexed position, each of said molding members having a pair of transversely spaced and continuous ridges formed thereon, and fastener means for securing said pair of molding members to the respective frame members of said first and second openings with an arm member of said boot located between each of said pair of molding members and the associated frame member whereby said pair of ridges are located in the channel of the associated arm member and serve to press the latter at localized points thereof into sealing engagement with said associated frame member and said lip sealingly contacts the outer surface of said enclosure.

* * * * *